United States Patent [19]
Weisgerber

[11] 4,368,874
[45] Jan. 18, 1983

[54] LOG LIFTER

[75] Inventor: David J. Weisgerber, Gresham, Oreg.

[73] Assignee: Omark Industries, Inc., Portland, Oreg.

[21] Appl. No.: 310,134

[22] Filed: Oct. 9, 1981

Related U.S. Application Data

[63] Continuation of Ser. No. 174,877, Aug. 4, 1980, abandoned.

[51] Int. Cl.³ ............................................... B65G 7/12
[52] U.S. Cl. ....................................... 254/131; 294/17
[58] Field of Search ...................... 254/94, 131, 131.5; 294/17; 248/346

[56] References Cited

U.S. PATENT DOCUMENTS

| | | | |
|---|---|---|---|
| 596,579 | 1/1898 | Dutton | 254/131.5 |
| 1,635,291 | 7/1927 | Smith et al. | 254/94 |
| 2,162,668 | 6/1939 | Stocker | 254/94 |
| 2,539,231 | 1/1951 | Davis | 254/131 |
| 2,693,935 | 11/1954 | Halbert | 254/131 |
| 2,733,895 | 2/1956 | Trenkle | 254/131 |
| 2,910,271 | 10/1959 | Keehn | 254/131 X |
| 2,929,609 | 3/1960 | Grael | 254/131 |
| 4,087,077 | 3/1978 | Vance | 254/94 |
| 4,221,416 | 9/1980 | Piontkowski et al. | 294/17 |

Primary Examiner—Robert C. Watson
Attorney, Agent, or Firm—Klarquist, Sparkman, Campbell, Leigh, Whinston & Dellett

[57] ABSTRACT

A rearwardly sloping, elongated handle is fastened to a unitary, flat metal base plate having a forward log engaging blade portion extending from a horizontally disposed sole portion, and a rearward heel portion joined to the sole portion by means of a curved intermediate section. The blade portion is urged under a log for rocking the same rearwardly over the curved section of the base plate.

7 Claims, 6 Drawing Figures

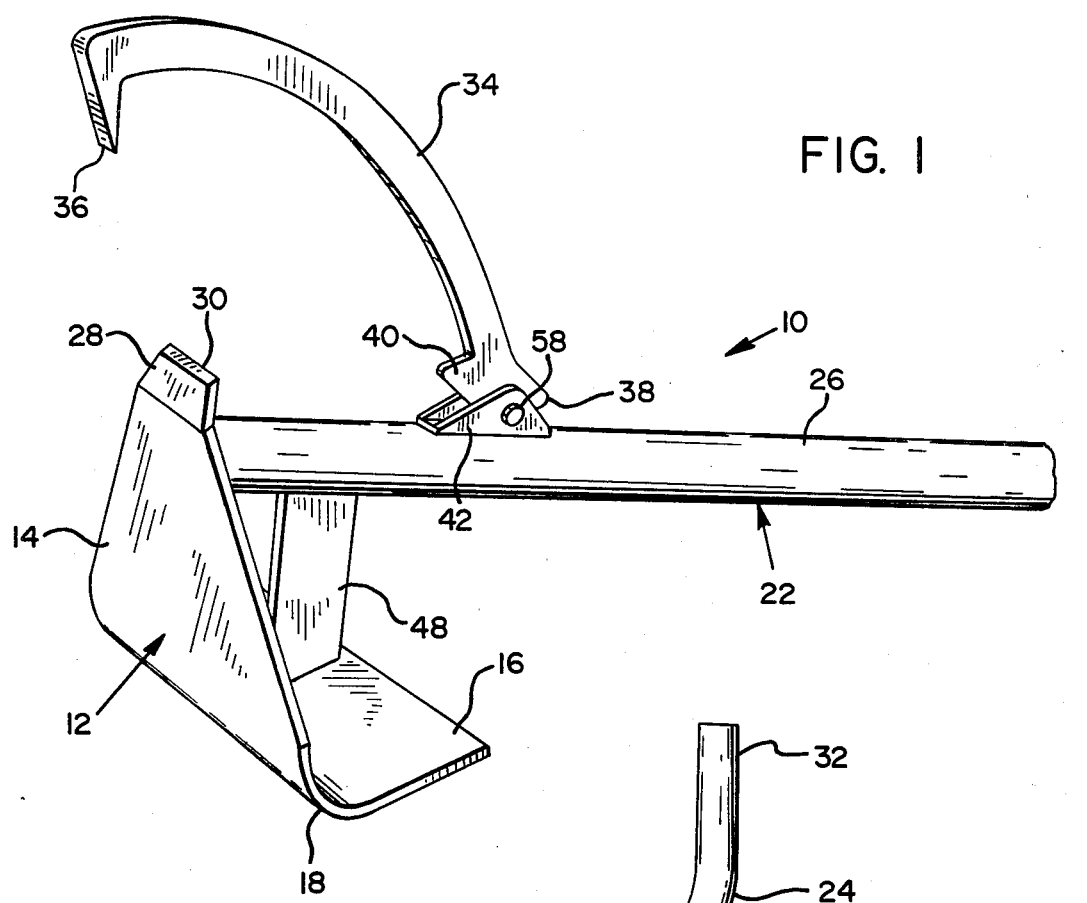
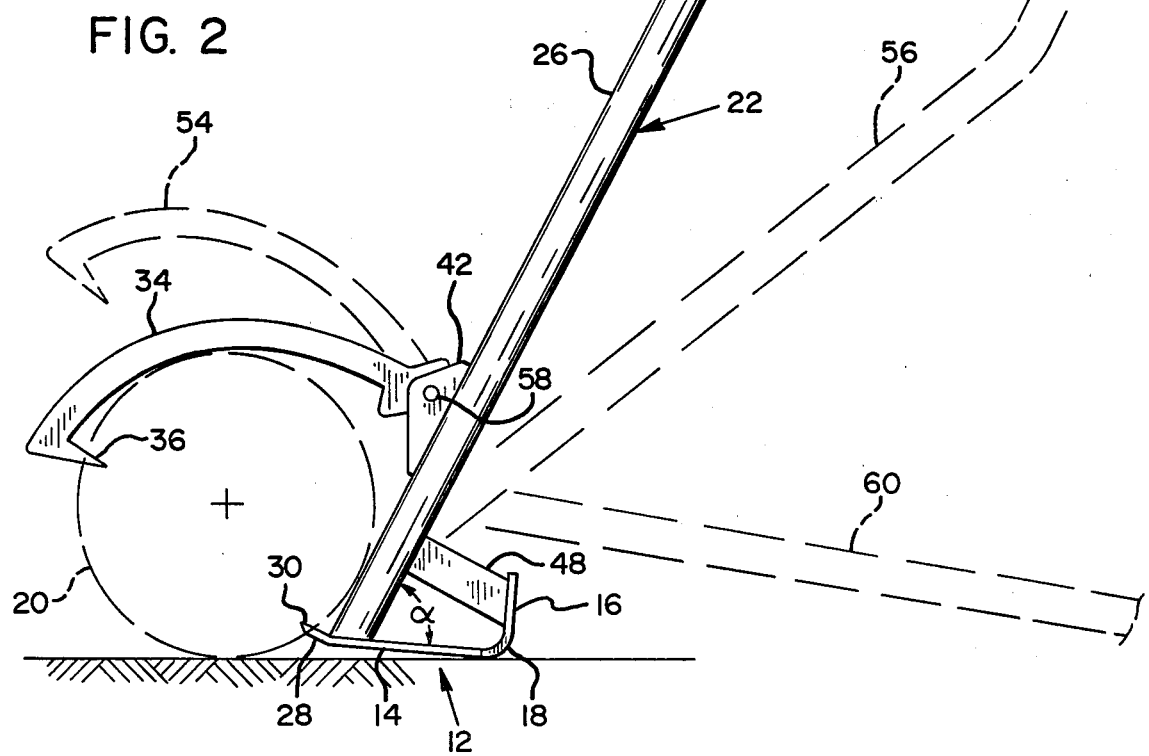

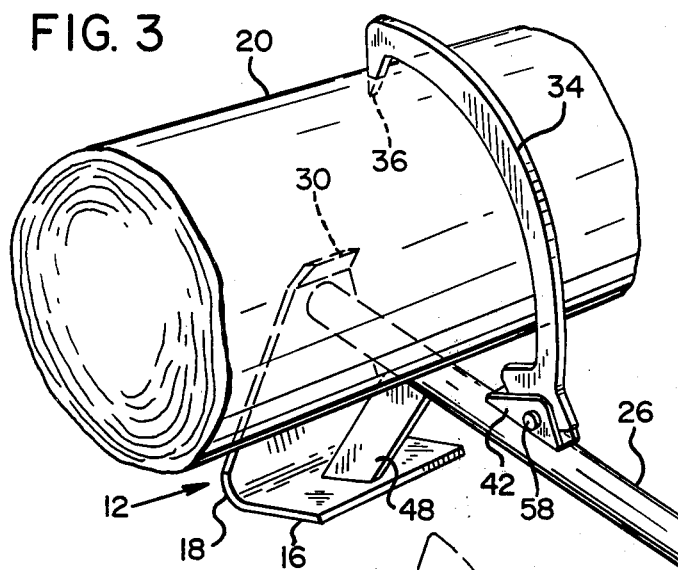
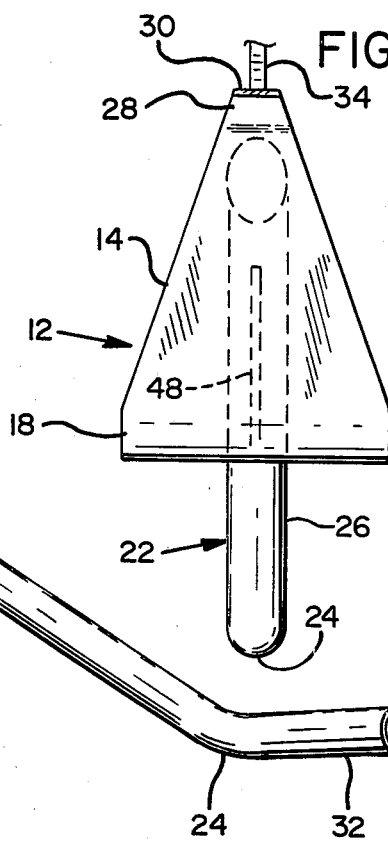
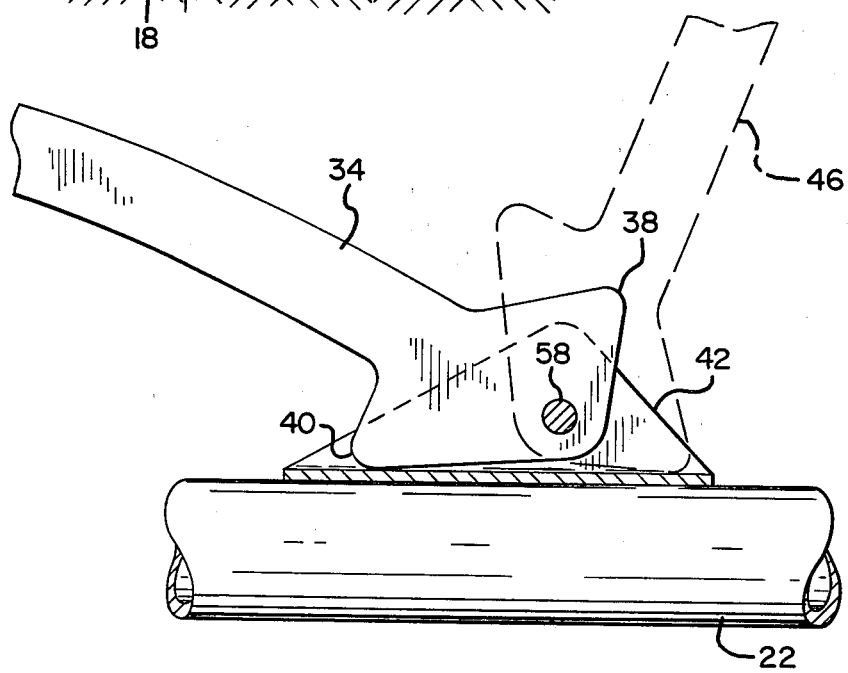
FIG. 3
FIG. 5
FIG. 4
FIG. 6

LOG LIFTER

This is a continuation of application Ser. No. 174,877, filed Aug. 4, 1980, now abandoned.

BACKGROUND OF THE INVENTION

The present invention relates to a log lifter and particularly to a log lifter that is characterized by stability and ease of operation.

A typical log lifting device employs a lever for moving a log upwardly away from the ground whereby the log can be more easily reached for sawing purposes in such manner that sawn sections will separate without entrapping the saw blade in the kerf. Most prior art devices require considerable lifting effort or are characterized by support instability, especially on uneven ground. Prior art devices have also been somewhat cumbersome in construction and have sometimes lacked structural capabilities for adequately lifting or supporting a log.

SUMMARY OF THE INVENTION

In accordance with the present invention in a preferred embodiment thereof, a log lifter includes an integral, unitary base plate provided with a broad continuous undersurface that is smoothly curved in a longitudinal direction adapting the base plate to roll rearwardly after engaging a log. The base plate preferably includes a forward sole portion having an integral, upturned, forward blade portion, a rearward upstanding heel portion, and a smoothly curved intermediate section. A rearwardly sloping operating handle is secured to the sole portion of the base plate, adapting the blade portion of the base plate to engage the underside of the log with the log received against the handle. Gripping of the log is facilitated and the log can be rocked rearwardly without lifting the log to the extent required by prior art devices. The wide, unitary base plate provides strength and contributes to a stable log support.

Pursuant the above described lifting operation, the log is supported on the lifter in an "over center" position with the handle sloping downwardly toward the ground. The handle, although elongated, is bent part way therealong to assure a steep angle with respect to the ground. Past the bend, the handle is angled forwardly to provide for ease in grasping the same.

The handle pivotally carries a log hook arm which swings forwardly to engage the upper side of the log. This log hook arm has a forward stop to prevent the hook arm from engaging the blade portion of the base plate, and the hook arm is also provided with a rearward stop preventing the hook arm from pivoting backward against the handle and harming the operator. The backward position also functions to cradle a log as may be supported against the hook arm to prevent rearward falling of the log.

It is accordingly an object of the present invention to provide an improved log lifter which is easier to use and requires less force to employ than prior art devices.

It is another object of the present invention to provide an improved log lifter which is more stable in operation as compared with prior devices, and consequently safer to use.

It is another object of the present invention to provide an improved log lifter which achieves secure and stable positioning of a log for sawing and the like.

It is another object of the present invention to provide an improved log lifter characterized by strength as well as economy of construction.

It is another object of the present invention to provide an improved log lifter of simplified construction that can also be employed as a peavey.

The subject matter which I regard as my invention is particularly pointed out and distinctly claimed in the concluding portion of the specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a perspective view, partially broken away, of a log lifter according to the present invention in a down-turned position;

FIG. 2 is a side view of a log lifter according to the present invention, illustrating operation thereof;

FIG. 3 is a perspective view further illustrating operation of a log lifter according to the present invention in supporting a log in an upraised position;

FIG. 4 is a side view of a log lifter according to the present invention in down-turned position;

FIG. 5 is an end view of a log lifter according to the present invention; and

FIG. 6 is a broken away view, partially in cross section, illustrating pivotal engagement of a log hook arm with the device's operating handle.

DETAILED DESCRIPTION

Referring to the drawings, a log lifter 10 according to the present invention comprises a unitary base plate 12 formed of flat metal including a planar sole portion 14 adapted to rest substantially horizontally on the ground during the initial stage of operation of the device (see FIG. 2), and a planar heel portion 16 disposed rearwardly of the sole portion. The heel portion suitably extends upwardly at an angle of approximately ninety degrees to the sole portion, while the undersurface of the base plate is continuous and smoothly curved in a longitudinal direction between the sole portion and the heel portion as indicated at intermediate portion 18, adapting the base plate to roll rearwardly after engaging a log. The forward end of the sole portion is provided with an upwardly angled blade portion 28 which comprises a forwardly protruding extension of the sole portion and which makes an angle of approximately twenty-five degrees with the horizontal sole portion. The blade portion has a relatively sharp lateral edge or point 30 adapted to engage the underside of log 20. A rearwardly inclined, elongated, tubular metal handle 22 is secured, as by welding, to the forward top surface of the sole portion of the base plate and has substantial length for providing leverage in turning or rolling the log. The handle is bent at 24 to define a first substantially straight portion 26 between the base plate and the bend, said straight portion making an acute angle α with said base plate wherein α is suitably about sixty-five degrees. Beyond the bend 24, the handle includes a forwardly angled, straight section 32, the purpose of which will hereinafter more fully appear. The angle between sections 26 and 32 of the handle is also suitably approximately twenty-five degrees. Disposing handle 22 at an angle α renders the device easier to use by locating the blade portion 28 up under log 30, with the log resting against the handle. The log is then engaged and rolled in a clockwise direction, as viewed in FIG. 2, with a minimum of effort. Under these circumstances it is possible to utilize a shortened handle 22.

The unitary metal base plate 12 is substantially broader in lateral direction than handle 22, i.e. in a direction along the log, having a width several times the width or diameter of the handle, the base plate being horizontal in transverse cross section whereby to provide stability in operation and in support of a log without appreciable danger of the device falling sideways. Thus, although the base plate undersurface is curved longitudinally in intermediate section 18, the base plate including the curved intermediate section 18 is substantially flat in its lateral or transverse cross section. The base plate is widest in the region of heel portion 16, and in the curved intermediate portion 18 between the sole portion and the heel portion, while the sole portion 14 narrows in trapezoidal fashion toward blade portion 28 as best seen in FIG. 5. Nevertheless, the forward edge 30 of the blade portion still has a substantial horizontal extent, being comparable in width to the diameter of handle 22. A flat metal brace 48 is secured, as by welding, between heel portion 16 of the base plate and the handle 22 to insure adequate strength for the base plate in receiving and turning a log. The integral or unitary base plate, particularly with the braced construction, provides a strong and dependable log lifter and support.

Handle 22 is provided on its forward side with a curved log hook arm 34 having a pivotal connection with the handle via pin 58 disposed across clevis member 38 secured to the handle. The log hook arm includes, at its forward end, an inwardly directed, log engaging point 36, and at its pivoted end includes a rearward cam stop 38 and a forward cam stop 40. Clevis member 42 is triangular shaped longitudinally and U-shaped in lateral cross section for receiving the cam stops against the bottom of the U-shape in order to limit forward and backward movement of the log hook arm. The log hook arm is normally employed for swinging forwardly and engaging the upper side of the log as illustrated in FIGS. 2 and 3. However, the forward cam stop 40 restrains forward movement of the log hook arm to the angular position indicated at 44 in FIG. 4 in order to prevent engagement of the log hook arm with blade portion 28 of the base plate and prevent injury of operating personnel. The rear cam stop restrains the log hook arm to the angular position indicated at 46 in FIG. 4 and also prevents injury of operating personnel by the rearwardly swinging log hook arm. Moreover, the log hook arm is restrained for catching log 20 should the same tend to fall or roll rearwardly, to the right as indicated in FIG. 4, when the log is upwardly supported on the log lifter device according to the present invention. A cradle is provided for the log by the log hook arm and the lower part of the triangular clevis member 42. The log engaging point 36 of the log hook arm is preferably hooked slightly backwardly in the direction of pin 58, making an angle of somewhat less than ninety degrees with the arm 34 where the point 36 joins the arm. The log or log bark is thereby more securely engaged between point 36 and edge 30 of blade portion 28. As will be observed from FIGS. 2 and 4, the curvature of the forwardly extending log hook arm 34 is sufficient for curving around the upwardly disposed surface of a log accommodated between point 30 and clevis 42 such that the point 36 may engage the log.

The operation of the log lifter according to the present invention is illustrated in FIGS. 2, 3 and 4. The rearwardly inclined handle 22 enables the operator to urge the base plate 12 well under the log, as illustrated in FIG. 2, causing forward edge 30 of blade portion 28 to engage the underside of the log, with the log disposed substantially against handle 22. The log hook arm 34 is rotated downwardly from the dashed line position indicated at 54 to the full line position whereby its forward point 36 can engage the upper side of the log. The handle 22 is urged rearwardly, in a clockwise manner in FIG. 2 through positions 56 and 60 for turning and lifting the log so that it is supported on the log lifter in the position illustrated in FIGS. 3 and 4. During lifting, and in the subsequent upraised position as illustrated in FIGS. 3 and 4, the log is supported above the arm 22 and may be cradled back against the log hook arm 34.

It will be noted that the curved undersection 18 of the base plate facilitates the easy rolling of the log rearwardly without undue strength being required from the operator. Extending the blade portion 28 underneath the log as allowed by the rearwardly angled handle 22 facilitates combined rolling and lifting the log rearwardly without lifting the log to as great an extent as would be the case in prior art devices, further easing operation of the device. The leverage attained also provides enhanced lifting and gripping force.

The length of the base plate, i.e. between the blade portion 28 and the heel portion, determines the height to which the log will be lifted and may be made shorter or longer. Also, the radius of curvature shown for curved section 18 of the base plate is by way of example only, and a greater radius of curvature, for example, may be employed if so desired.

With almost any moderately sized log, it will be observed from FIG. 4 that the log center 50 will reside in a stable "over center" condition by a distance D with reference to the point of ground contact of the base plate acting as a fulcrum, with the handle 22 sloping downwardly toward the ground. The log hook arm 34 is disposed far enough up the handle 22 such that the log, if leaning against the log hook arm or substantially so, will tend toward the "over center" position. In further regard to the "over center" positioning, it is noted the handle 22 makes a comparatively steep angle $\theta$ with a parallel ground surface when a log is supported on the log lifter according to the present invention. This steep angle for tilting the log lifter and log to a satisfactory "over center" position is made possible, while maintaining an angularly disposed, relatively long handle 22 for leverage, by bending the handle at 24 and providing the aforementioned forwardly angled section 32 beyond the bend whereby the handle may be grasped rearwardly of the bend. An entirely straight handle would provide adequate leverage but would decrease the angle $\theta$. Also, the upraised handle section 32 avoids danger to the operator's hand positioned between the handle and the ground surface.

Although the device according to the present invention is primarily employed for lifting and supporting logs in an upraised position as hereinbefore described, it is also readily employed as a log turner, peavey or cant hook.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A log lifter adapted to be manually operated for raising logs, comprising:

an L-shaped unitary flat metal base plate having a continuous undersurface, said base plate including a planar sole portion disposed substantially horizontally with respect to the ground when said log lifter is in an initial log engaging position, a lateral blade portion extending forwardly of said sole portion to provide a horizontal log engaging edge, a substantially vertical heel portion at the remote end of said base plate from said blade portion, and a smoothly curved portion joining the sole portion to the heel portion adapting said base plate to roll rearwardly after engagement of said log by said blade portion, and an operating handle secured to the forward top surface of the sole portion next adjacent the blade portion and slanting rearwardly therefrom, said sole portion extending horizontally therefrom toward said curved portion well rearwardly of said handle to maintain an initial substantially horizontal attitude of said sole portion with said handle slanting rearwardly, said handle being mounted at an angle to said sole portion for adapting said blade portion to be urged up under the near side of a log and adapting the log to be supported against said handle, said angle being acute between said handle and said sole portion as it extends rearwardly from said blade portion, said blade portion and said sole portion where it adjoins said blade portion having a narrow width comparable to the diameter of said handle where it is secured to said sole portion, said base plate flaring outwardly in trapezoidal manner over the length of said sole portion from said narrow width at said blade portion to a width at said curved portion and at said heel portion which is several times the width of said handle where the latter is secured to said sole portion, said handle being provided on the forward side thereof with a pivotally connected outwardly curved log hook arm for engaging the upper side of said log.

2. The log lifter according to claim 1 wherein said handle has appreciable length for providing leverage in turning said log, said handle being bent therealong to form a first substantially straight portion between said base plate and said bend, said straight portion making said acute angle with said base plate, and a forwardly angled portion on the remote side of said bend from said first portion.

3. The log lifter according to claim 1 wherein said hook arm is provided with a hook arm stop for restraining rotation of said hook arm in an outward direction away from said base plate to prevent a log engaged between said blade portion and said hook arm from falling rearwardly.

4. The log lifter according to claim 3 wherein said hook arm is also provided with a forward stop to restrain movement thereof in a forward direction toward said base plate beyond a predetermined position.

5. The log lifter according to claim 1 wherein said blade portion is angularly upturned with respect to said sole portion of said base plate.

6. The log lifter according to claim 1 wherein said heel portion is substantially planar and disposed at approximately a ninety degree angle with respect to said sole portion.

7. The log lifter according to claim 1 further including a flat vertically disposed brace between said handle and said heel portion of said base plate rearward of said handle.

* * * * *